US007222104B2

(12) United States Patent
Tadayon et al.

(10) Patent No.: US 7,222,104 B2
(45) Date of Patent: *May 22, 2007

(54) METHOD AND APPARATUS FOR TRANSFERRING USAGE RIGHTS AND DIGITAL WORK HAVING TRANSFERRABLE USAGE RIGHTS

(75) Inventors: Bijan Tadayon, Germantown, MD (US); Aram Nahidipour, Mill Creek, WA (US); Xin Wang, Los Angeles, CA (US); Michael C Raley, Downey, CA (US); Guillermo Lao, Torrance, CA (US); Thanh T Ta, Huntington Beach, CA (US); Charles P Gilliam, Darien, CT (US)

(73) Assignee: ContentGuard Holdings, Inc., Wilmington, DE (US)

( * ) Notice: Subject to any disclaimer, the term of this patent is extended or adjusted under 35 U.S.C. 154(b) by 913 days.

This patent is subject to a terminal disclaimer.

(21) Appl. No.: 09/867,746

(22) Filed: May 31, 2001

(65) Prior Publication Data
US 2002/0184156 A1 Dec. 5, 2002

(51) Int. Cl.
*G06Q 99/00* (2006.01)
*H04K 1/00* (2006.01)
*H04L 9/00* (2006.01)

(52) U.S. Cl. .............................. 705/54; 705/51; 705/52; 705/53; 705/55; 705/56; 705/57; 705/58; 705/80; 705/59; 707/9; 715/532; 726/26

(58) Field of Classification Search .................. 705/20, 705/21, 50, 51–59, 80, 1; 713/156–160, 713/166–167; 380/201–203, 230–231; 707/101, 707/104, 9
See application file for complete search history.

(56) References Cited

U.S. PATENT DOCUMENTS 3,263,158 A 7/1966 Janis (Continued)

FOREIGN PATENT DOCUMENTS

EP 0 084 441 7/1983

(Continued)

OTHER PUBLICATIONS

Perritt, Henry H., Knowbots, permission Headers and Contract Law (paper for the conference on Technological Strategies for protecting Intellectual Property in the Networked Multimedia environment, Apr. 2-3, 1993, with revisions of Apr. 30, 1993).*

(Continued)

*Primary Examiner*—James P. Trammell
*Assistant Examiner*—Cristina Owen Sherr
(74) *Attorney, Agent, or Firm*—Marc S. Kaufman; Carlos R. Villamar; Nixon Peabody, LLP

(57) ABSTRACT

A method and apparatus for facilitating transfer of usage rights for digital content. The system comprises digital content, a usage rights module containing usage rights information associated with the content for a user, a transfer permission module containing transfer permission information for the content, a current user identification module containing identity information indicating the identity of the user, and means for manipulating the current user identification module to change the identity information. The content can be transferred form one user to another and the current user identification module can be manipulated to reflect the current user and to permit the current user to have usage rights in the document.

14 Claims, 3 Drawing Sheets

U.S. PATENT DOCUMENTS

| | | | |
|---|---|---|---|
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,220,991 A | 9/1980 | Hamano et al. | |
| 4,278,837 A | 7/1981 | Best | |
| 4,323,921 A | 4/1982 | Guillou | |
| 4,442,466 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,644,493 A | 2/1987 | Chandra et al. | |
| 4,658,093 A | 4/1987 | Hellman | |
| 4,713,753 A | 12/1987 | Beobert et al. | |
| 4,796,220 A | 1/1989 | Wolfe | |
| 4,817,140 A | 3/1989 | Chandra et al. | |
| 4,827,508 A * | 5/1989 | Shear | 705/53 |
| 4,868,376 A | 9/1989 | Lessin et al. | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder, Sr. et al. | |
| 4,961,142 A | 10/1990 | Elliott et al. | |
| 4,975,647 A | 12/1990 | Downer et al. | |
| 4,977,594 A * | 12/1990 | Shear | 705/53 |
| 4,999,806 A | 3/1991 | Chernow et al. | |
| 5,010,571 A | 4/1991 | Katznelson | |
| 5,014,234 A | 5/1991 | Edwards, Jr. | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,291,596 A | 3/1994 | Mita | |
| 5,301,231 A | 4/1994 | Abraham et al. | |
| 5,311,591 A | 5/1994 | Fischer | |
| 5,319,705 A | 6/1994 | Halter et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,394,469 A | 2/1995 | Nagel et al. | |
| 5,410,598 A | 4/1995 | Shear | |
| 5,412,717 A | 5/1995 | Fischer | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,816 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,539,735 A | 7/1996 | Moskowitz | |
| 5,563,946 A | 10/1996 | Cooper et al. | |
| 5,568,552 A | 10/1996 | Davis | |
| 5,621,797 A | 4/1997 | Rosen | |
| 5,629,980 A | 5/1997 | Stefik et al. | |
| 5,633,932 A | 5/1997 | Davis et al. | |
| 5,634,012 A | 5/1997 | Stefik et al. | |
| 5,638,443 A * | 6/1997 | Stefik et al. | 705/54 |
| 5,649,013 A | 7/1997 | Stuckey et al. | |
| 5,655,077 A | 8/1997 | Jones et al. | |
| 5,708,717 A | 1/1998 | Alasia | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,748,783 A | 5/1998 | Rhoads | |
| 5,757,907 A | 5/1998 | Cooper et al. | |
| 5,761,686 A | 6/1998 | Bloomberg | |
| 5,765,152 A | 6/1998 | Erickson | |
| 5,768,426 A | 6/1998 | Rhoads | |
| 5,825,892 A | 10/1998 | Braudaway et al. | |
| 5,892,900 A * | 4/1999 | Ginter et al. | 726/26 |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A * | 7/1999 | Hall et al. | 707/9 |
| 5,940,504 A * | 8/1999 | Griswold | 705/59 |
| 5,943,422 A * | 8/1999 | Van Wie et al. | 705/54 |
| 5,949,876 A | 9/1999 | Ginter et al. | |
| 5,982,891 A | 11/1999 | Ginter et al. | |
| 5,999,949 A * | 12/1999 | Crandall | 715/532 |
| 6,047,067 A | 4/2000 | Rosen | |
| 6,112,181 A | 8/2000 | Shear et al. | |
| 6,115,471 A | 9/2000 | Oki et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,226,618 B1 | 5/2001 | Downs et al. | |
| 6,233,684 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,327,652 B1 | 12/2001 | England et al. | |
| 6,330,670 B1 | 12/2001 | England et al. | |
| 6,345,256 B1 | 2/2002 | Milsted et al. | |
| 6,363,488 B1 | 3/2002 | Ginter et al. | |
| 6,389,402 B1 | 5/2002 | Ginter et al. | |
| 6,427,140 B1 * | 7/2002 | Ginter et al. | 705/80 |
| 6,434,535 B1 * | 8/2002 | Kupka et al. | 705/24 |
| 6,611,812 B2 * | 8/2003 | Hurtado et al. | 705/26 |

FOREIGN PATENT DOCUMENTS

| | | |
|---|---|---|
| EP | 0 180 460 | 5/1986 |
| EP | 0 332 707 | 9/1989 |
| EP | 0 651 554 | 5/1995 |

| | | |
|---|---|---|
| EP | 0 668 695 | 8/1995 |
| EP | 0 725 376 | 8/1996 |
| GB | 2 136 175 | 9/1984 |
| GB | 2 236 604 | 4/1991 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 99/49615 | 9/1999 |
| WO | WO 01/63528 | 8/2001 |

OTHER PUBLICATIONS

Henry H. Perritt, Jr., "Technological Strategies for Protecting Intellectual Property in the Networked Multmedia Enviroment", Apr. 2-3, 1993, Knowbots, Permissions Headers & Contract Law.
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Gaurd", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmel, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.

* cited by examiner

METHOD AND APPARATUS FOR TRANSFERRING USAGE RIGHTS AND DIGITAL WORK HAVING TRANSFERRABLE USAGE RIGHTS

RELATED APPLICATION DATA

This application is related to Applicants'concurrently filed U.S. patent applications entitled METHOD AND APPARATUS FOR ESTABLISHING USAGE RIGHTS FOR DIGITAL CONTENT TO BE CREATED IN THE FUTURE (Ser. No. 09/867,747), DEMARCATED DIGITAL CONTENT AND METHOD FOR CREATING AND PROCESSING DEMARCATED DIGITAL WORKS (Ser. No. 09/867,246, METHOD AND APPARATUS FOR DYNAMICALLY ASSIGNING USAGE RIGHTS TO DIGITAL WORKS (Ser. No. 09/867,745, METHOD AND APPARATUS FOR ASSIGNING CONDITIONAL OR CONSEQUENTIAL RIGHTS TO DOCUMENTS AND DOCUMENTS HAVING SUCH RIGHTS (Ser. No. 09/867, 749 111325-64), and METHOD AND APPARATUS FOR HIERARCHICAL ASSIGNMENT OF RIGHTS TO DOCUMENTS AND DOCUMENTS HAVING SUCH RIGHTS (Serial No. 09/867,748), incorporated herein by reference in their entirety.

BACKGROUND

The invention relates generally to distribution of digital works and more specifically to digital works having usage rights that can be transferred to others and a method and apparatus for effecting such a transfer.

One of the most important issues impeding the widespread distribution of digital works or documents (i.e. documents in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein. There are a number of issues to be considered in digital rights management: authentication, authorization, accounting, payment and financial clearing, rights specification, rights verification, rights enforcement, and document protection for example. U.S. Pat. Nos. 5,530, 235, 5,634,012, 5,715,403, 5,638,443, and 5,629,980 disclose DRM concepts addressing these issues and the disclosures thereof are incorporated herein by reference.

In the world of printed documents, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works. Accordingly, some method of protecting digital works is necessary to make it more difficult to copy them without authorization.

Unfortunately, it has been widely recognized that it is difficult to prevent, or even deter, people from making unauthorized distributions of digital works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies will render it even more convenient to distribute large documents electronically, including video files such as full length motion pictures, and thus will remove any remaining deterrents to unauthorized distribution of digital works. Accordingly, DRM technologies are becoming a high priority.

Two basic DRM schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPES™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC's and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital works. Each rendering device has a repository associated therewith. A predetermined set of usage transaction steps define a protocol used by the repositories for carrying out usage rights associated with a work. Usage rights are encapsulated with the content of the digital work or otherwise associated with the content to travel with the content. The usage rights can permit various types of use such as, viewing only, use once, distribution, and the like. Rights can be granted based on payment or other conditions.

Current DRM techniques do not provide the flexibility of distribution that is possible with conventional printed documents. For example, the purchaser of a copy of a book generally can give that same copy to another, trade that copy, or sell that copy without violating the rights of the copyright holder. However, DRM techniques do not provide a flexible means for accomplishing analogous distribution of digital works without diminishing the control over the digital work by the content owner.

SUMMARY OF THE INVENTION

It is an object of the invention to increase the flexibility of distribution of digital content. A first aspect of the invention is a method of transferring digital works from one user to another user comprising, associating usage rights, transfer permission information, and a current user identification flag with digital content, distributing a digital work including the content to a first user in accordance with the usage rights, setting the current user identification flag to correspond to the first user, and transferring the digital work to a second user and setting the current user identification flag to correspond to the second user.

A second aspect of the invention is a system for transferring digital works from one user to another user. The system comprises digital content, a usage rights module containing usage rights information associated with the content for a user, a transfer permission module containing transfer permission information for the content, a current user identification module containing identity information indicating the identity of the user, and means for manipulating the current user identification module to change the identity information.

BRIEF DESCRIPTION OF THE DRAWING

The invention will be described through a preferred embodiment and the attached drawing in which.

DETAILED DESCRIPTION

Figure 1:
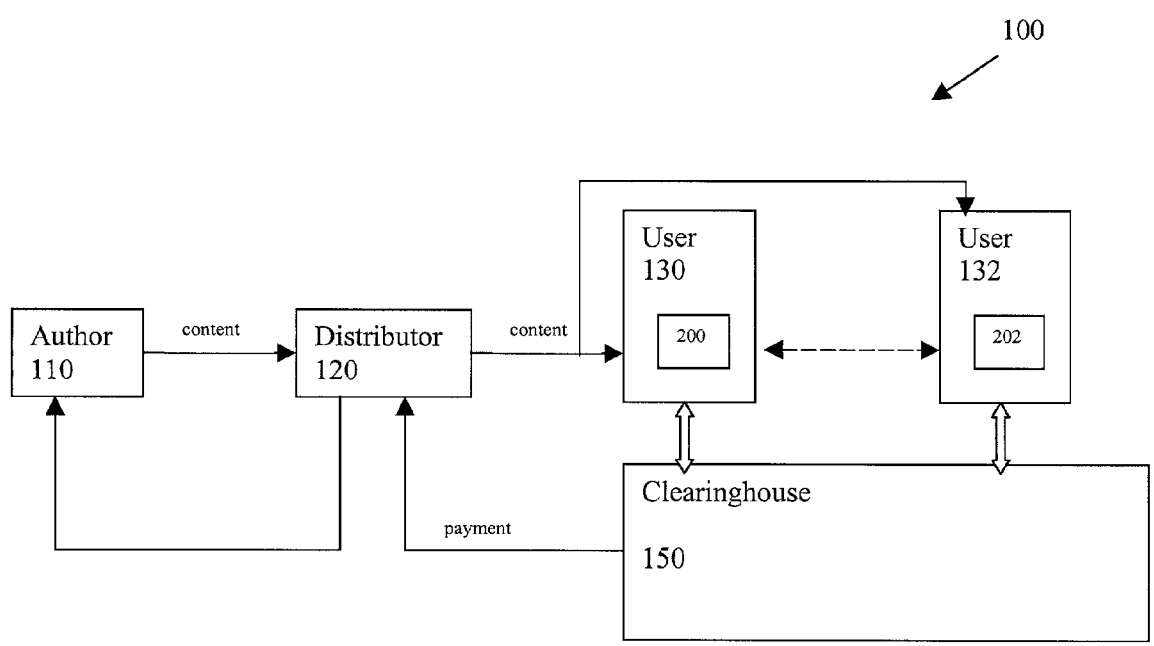
FIG. 1 is a block diagram of a distribution system in accordance with the preferred embodiment.

FIG. 1 is a block diagram of a system for the electronic distribution of digital works, which may include correspondence, books, magazines, journals, newspapers, other papers, software, audio and video clips, and other files objects and the like in accordance with the preferred embodiment. The phrase "digital work" as used herein refers to any type of element having content in computer readable form. "Content" as used herein refers to the viewable or otherwise usable portion of a digital work. Author 110 creates original content 112 and passes it to distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party as distributor 120 and thus the author and distributor may be the same entity. However, the division of functions set forth in FIG. 1 is more efficient, as it allows author 110 to concentrate on content creation and not the administrative functions of distribution. Moreover, such a breakdown facilitates economies of scale by permitting distributor 120 to associate with a number of authors 110.

Distributor 120 distributes digital works, such as works 200 and 202 to users 130 and 132 upon request. The digital works can be distributed as a document containing the content and associated usage rights in encrypted form. Distributor 120 encrypts the works with a public key and then encrypts the public key with a private key corresponding to user 130 or 132. Thus the encrypted work is customized solely for the particular user 130 or 132. Users 130 and 132 are then able to use their private key to unencrypt the public key and use it to unencrypt and view the content of the work 200 or 202. Of course, there can be any number of users and any number of digital works. For the sake of simplicity, there are two users and two digital works in the preferred embodiment.

Payment for the work is passed from user 130 or 132 to distributor 120 by way of clearinghouse 150 which collects requests from user 130 and 132 and from other users who wish to sue use a particular content. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110. Distributor 120 may compile a bundle or batch of user requests for a single work before distributing the work. In such a case, a single instance of the encrypted work can be generated for unencryption by all of the requesting users 130. Clearinghouse 150 also maintains various records regarding ownership and usage rights as described in detail below.

Each time user 130 or 132 requests (or uses) content of a work, an accounting message can be sent to clearinghouse 150 which ensures that each request by user 130 matches with a document sent to user 130 or 132 by distributor 120. Accounting information is received by clearinghouse 150 directly from distributor 120. Any inconsistencies can be used adjust the payment batches made to distributor 120 accordingly. This accounting scheme is operative to reduce the possibility of fraud in electronic distribution and to handle any time-dependent usage permissions that may result in charges that vary, depending on the duration or other extent of use. Clearinghouse 150 includes server 250 (see FIG. 2), a programmable general purpose computer for example. Server 250 includes a processor which runs rights transfer module 252 in the form of software code. The function of rights transfer module 252 is described in detail below.

Figure 2:
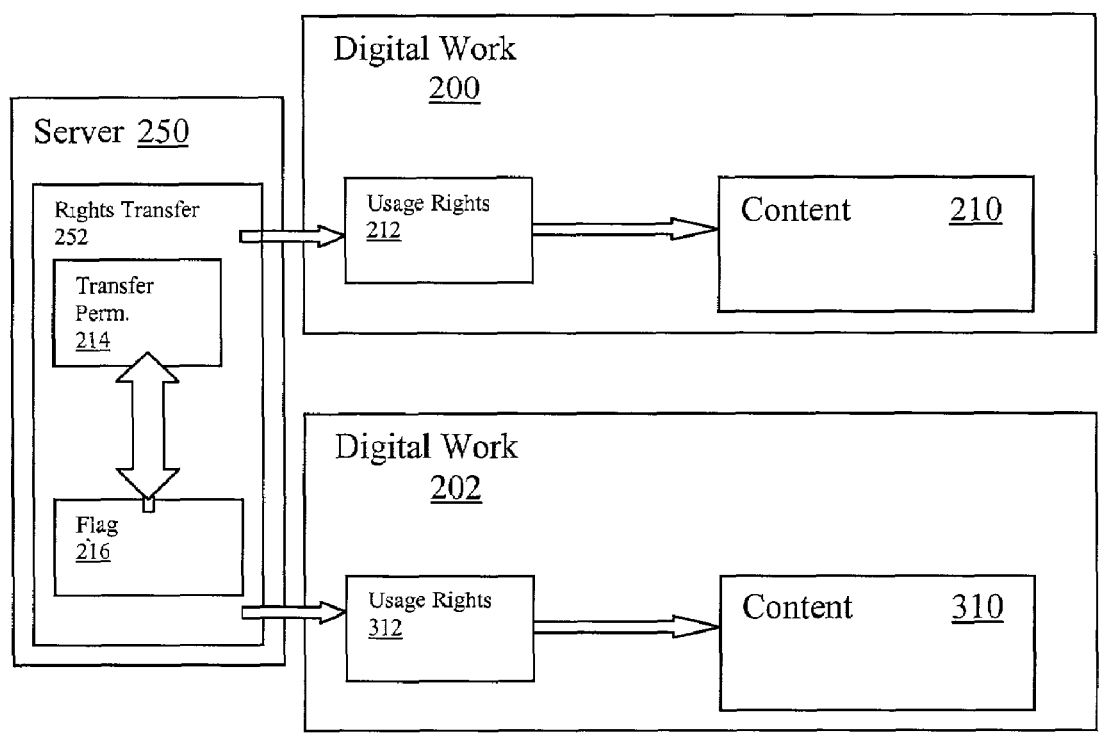
FIG. 2 is a schematic illustration of the relationship between a digital work and the distribution server of the preferred embodiment.

FIG. 2 illustrates the mechanism for facilitating the transfer of usage rights in accordance with the preferred embodiment. Under the assumption that digital work 200 has been distributed to user 130 and that digital work 202 has been distributed to user 132, an example of the preferred embodiment is described below. Digital work 200 includes content 210 and can be stored in a computer memory, such as a memory in a user device used for viewing content 210. For example, the user device can be a personal computer, and ebook reader, a personal digital assistant (PDA), or the like. In the example of the preferred embodiment, user 130 has a right to use content 210, and user 132 has a right to use content 310. Content 210 and content 310 have usage rights 212 and 312 respectively associated therewith and users 130 and 132 have respective licenses to use content 210 and content 310 in accordance with the usage rights.

If user 130 and user 132 desire to exchange their respective rights in content 210 and 310, i.e. user 130 desires rights to use content 310 and user 132 desires rights to use content 210, the exchange can be effected using current user ID flag module 216 of rights transfer module 252 to track the current user of content 210 and 310. Of course, the right to exchange is an additional right which has already been awarded and which is tracked in transfer permissions module 214. The exchange of usage rights may involve some fee, paid by user 130 to user 132 or vice versa. Rights transfer module 252 keeps track of this fee/percentage, and notifies the original content owners, who may be entitled to a percentage of the fee which was paid by a user (based on the license agreements between the users and the content owners). The price can be set using a predetermined, on-spot, or dynamic scheme, such as auction or stock-exchange. The exchange right/fee schedules can be attached to the content or other rights (physically, or by a pointer associated with a remote schedule). Current user ID flag module includes a database structure having a current user flag for each of works 200 and 202. Such a flag can be an ID number or any other indication of the current authorized user. The exchange may involve more than two users, in which case current user ID flag module 216 can keep track of rights, fees, percentages, content owners, and current users (an exchange forum, similar to a stock exchange setting).

Figure 3:
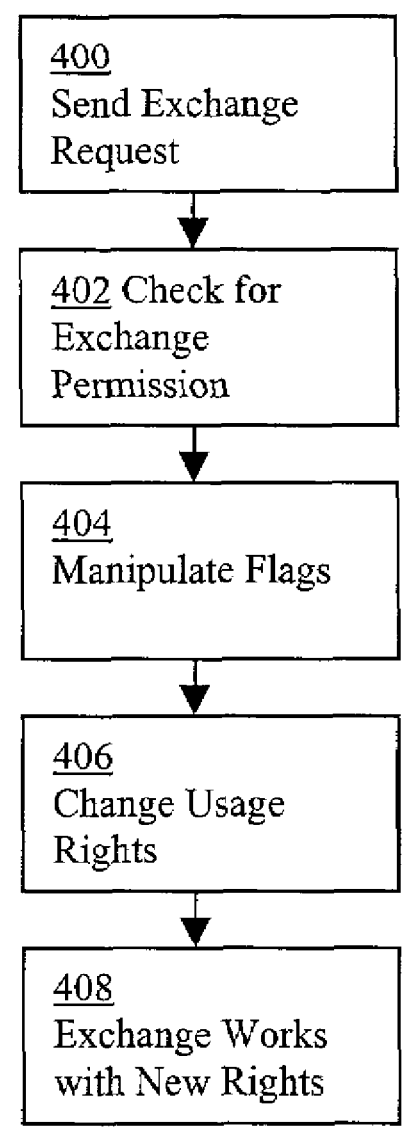
FIG. 3 is a flowchart of an exchange method of the preferred embodiment.

FIG. 3 illustrates an exchange method in accordance with the preferred embodiment. When users 130 and 132 wish to exchange usage rights to content, a request is sent to server 250 from one of the users in step 400. Rights transfer module 252 checks transfer permission module 214 to ascertain if the requested transfer has been authorized by the content owner or other applicable party in step 402. If such permission has been granted, transfer permission module 214 manipulates current user ID flag module 216 to reflect the exchange in current users of the content, i.e. user 130 because the current user of content 310 and user 132 becomes the current user of content 210, in step 404.

Subsequently, in step 406, transfer permissions module 214 changes the usage rights 212 and 312 to prohibit use by users 130 and 132 of content 210 and 310 respectively and to permit the same use by the new user 132 and 130 respectively. Finally, in step 408, works 200 and 202 are exchanged between users 130 and 132 with the new usage rights 212 and 312 respectively. Alternatively, works 200 and 202 can be redistributed from distributor 120 or clearinghouse 150 to users 130 and 132. In any case, clearinghouse 150 can track all transactions, usage rights, current user data, and the like.

The preferred embodiment can be adapted to an auction, as well. The right to auction can be awarded by the original content owner to the user, and the user can exercise this right, provided that the price limitations, time limitations, geographical limitations, and usage limitations (specified by the content owner) are followed. The price or range of price or percentages/fees/commissions can be predetermined, or can be dynamic, for example, using the market or other factors, for example, set by the current user. To encourage the exchange between friends, peer-to-peer distribution, or super-distribution, point or other rewards can be awarded to the user. Super-distribution can be done through e-mail or instant-messaging, using address books or "buddy lists."

The preferred embodiment can be used for version control, for updating/replacing (or providing patches or corrections for) content. The preferred embodiment can process returned content by a user, to obtain a refund, if the nature of the content permits and the owner of the content wishes to give this option to the user as an added usage right.

Instead of trading usage rights, user 130 may wish to merely grant remaining usage rights to user 132. For example, if user 130 buys a license to use software, and later wants to transfer the license to user 132, User 130 can transfer the usage rights to user 132 in a manner similar to the exchange described above. In such a case, clearinghouse 150 can collect an electronic signature from user 132 and send any appropriate notices, such as a terminating notice to user 130. If the content owner requires a fee for such a transfer, clearinghouse 150 can effect the fee transfer. In addition, a certification for disablement or destruction of the of the software in position of user 130 can be issued automatically by clearinghouse 150 and sent to the content owner or authorized representative.

Alternatively, user 130 may have the right to use content for a specific time period. User 130 then uses the content for a portion of the allowed time. However, before the expiration time period, user 130 can transfer the balance of remaining allowable time to user 132. This can be effected in the manner described above. Of course this right also can be assigned to user 130 by the original content owner.

In the case of accessing (or storing) information from multiple servers, clearinghouse 150 can keep track of all servers for an optimized accessing scheme. For example, tags can be used for identification and referral to a specific server for edge delivery of content on the Internet or any other network (as opposed to centralized content delivery), to solve the first-mile-bottleneck problem (related to traffic on the network).

The particular modules of the preferred embodiment have been described by functionality. However, the modules and need not be separate entities, such as separate files or even blocks of code. Also, the fucntions of the various modules can be mixed or combined. The various functions can be accomplished by any combination of software and/or hardware. For example, the invention can be implemented on one or more general purpose programmable computers, such as personal computers, servers, or the like. Date transfer can be accomplished using HTTP over the Internet or in any other manner.

Any usage rights can be transferred traded, or assigned. The various data and files can be stores at any location and linked in an appropriate manner. For example, the content and usage rights need not be stored together. Accordingly, "associated" as used herein refers broadly to an established correspondence such as a call or a link, or other relationship. The digital works can be transferred directly form user to user or through a centralized system. The usage rights include all usage rights that can be expressed by the XrML™ rights language and other rights grammar.

The invention has been described trough a preferred embodiment. However, various modifications can be made without departing from the scope of the invention as defined by the appended claims and legal equivalents.

What is claimed:

1. A method of transferring digital works from one user to another user comprising:

associating usage rights, transfer permission information, and a current user identification flag, with digital content, said usage rights specifying a permitted manner of use of said digital content;

electronically distributing a digital work including the content to a first user in accordance with the usage rights and setting the current user identification flag to correspond to the first user;

transferring the digital work to a second user and setting the current user identification flag to correspond to the second user; and allocating the usage rights between the first user and the second user such that the first user and the second user have an allocated percentage of the usage rights that is greater than zero percent and less than one hundred percent of the usage rights and such that a sum of the allocated percentage between the first user and the second user equals one hundred percent.

2. A method as recited in claim 1, wherein said transferring step comprises changing the usage rights in accordance with the transfer to the second user.

3. A method as recited in claim 2, wherein said changing step comprises changing the usage rights to permit use of the content by the second user and to prohibit use of the content by the first user.

4. A method as recited in claim 1, further comprising receiving notification that the user desires to distribute the digital work to a second user.

5. A method as recited in claim 1, wherein said transferring step comprises transferring usage rights without change for remaining usage period of time to the second user.

6. A method as recited in claim 2, wherein said transferring step further comprises downloading the content from the first user to the second user.

7. A method as recited in claim 2, wherein said transferring step further comprises downloading the content from a distributor to the second user.

8. A method as recited in claim 1, further comprising checking for transfer permission prior to said transferring step.

9. A system for transferring digital works from one user to another user comprising:

digital content in a memory;

a usage rights device containing usage rights information associated with the content for a first user, said usage rights specifying a permitted manner of use of said digital content;

a transfer permission module containing transfer permission information for the content;

a current user identification module containing identity information indicating the identity of the first user; and means for manipulating said current user identification module to change the current user identification flag of the identity information from a current user to a second user upon transferring the content from the first user to the second user, wherein the usage rights are allocated between the first user and the second user such that the first user and the second user have an allocated- percentage of the usage rights that is greater. than zero percent and less than one hundred percent of the usage rights and such that a sum of the allocated percentage between the first user and the second user equals one hundred percent.

10. A system as recited in claim 9, further comprising means for changing the rights in accordance with a change in identity information.

11. A system as recited in claim 9, wherein said usage rights module and said digital content are encrypted.

12. A system as recited in claim 11, wherein said usage rights module and said digital content are attached to one another as encapsulated element.

13. A system as recited in claim 12, wherein said transfer permission module and said current user identification module are located remotely from said encapsulated element.

14. A system as recited in claim 9, wherein said means for manipulating said current user identification module is responsive to notification that the first user desires to distribute the digital work to a the second user.

* * * * *